United States Patent
Frank et al.

(10) Patent No.: US 10,757,311 B2
(45) Date of Patent: *Aug. 25, 2020

(54) WEARABLE DEVICE

(71) Applicant: Jordan Frank, Providence, RI (US)

(72) Inventors: Jordan Frank, Providence, RI (US);
Alexander Dobrinsky, Vienna, VA (US)

(73) Assignee: Jordan Frank, Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,295

(22) Filed: Sep. 17, 2019

(65) Prior Publication Data

US 2020/0029003 A1 Jan. 23, 2020

Related U.S. Application Data

(63) Continuation of application No. 15/435,596, filed on Feb. 17, 2017, now Pat. No. 10,432,839, which is a (Continued)

(51) Int. Cl.
*H04N 5/225* (2006.01)
*G06F 1/16* (2006.01)
(Continued)

(52) U.S. Cl.
CPC .......... *H04N 5/2257* (2013.01); *A45F 5/00* (2013.01); *F16M 13/04* (2013.01); *G06F 1/163* (2013.01);
(Continued)

(58) Field of Classification Search
CPC ...... H04N 5/2257; H04N 5/907; H04N 5/247; H04N 5/2256; H04N 5/23206;
(Continued)

(56) References Cited

U.S. PATENT DOCUMENTS 7,618,260 B2 11/2009 Daniel et al.
8,934,045 B2 1/2015 Kam et al.
(Continued)

FOREIGN PATENT DOCUMENTS

EP 2770399 A1 8/2014

OTHER PUBLICATIONS

Aggarwal, Y., U.S. Appl. No. 15/435,596, Notice of Allowance, dated Jun. 12, 2019, 10 pages.
(Continued)

*Primary Examiner* — Yogesh K Aggarwal
(74) *Attorney, Agent, or Firm* — LaBatt, LLC

(57) ABSTRACT

A wearable device is provided. The device includes one or more bands, which can be formed of a flexible material, and can include one or more embedded conductive elements. One or more electronic components can be attached to the device at locations spaced from each other. The electronic components can include an imaging device, a light source, and/or one or more components which can be operated in conjunction with the imaging device and/or light source. The imaging device and/or light source can be rotatable about at least one rotation axis with respect to an orientation of a portion of the band tightly securing the wearable device around a body part.

26 Claims, 11 Drawing Sheets

Related U.S. Application Data continuation-in-part of application No. PCT/US2016/034919, filed on May 30, 2016.

(60) Provisional application No. 62/168,802, filed on May 30, 2015, provisional application No. 62/200,721, filed on Aug. 4, 2015.

(51) Int. Cl.
| | |
|---|---|
| *A45F 5/00* | (2006.01) |
| *F16M 13/04* | (2006.01) |
| *H04N 5/232* | (2006.01) |
| *H04N 5/247* | (2006.01) |
| *H04N 5/907* | (2006.01) |
| *H04N 7/18* | (2006.01) |

(52) U.S. Cl.
CPC .......... *G06F 1/1686* (2013.01); *H04N 5/2256* (2013.01); *H04N 5/23206* (2013.01); *H04N 5/247* (2013.01); *H04N 5/907* (2013.01); *H04N 7/181* (2013.01)

(58) Field of Classification Search
CPC .......... H04N 7/181; F16M 13/04; A45F 5/00; G06F 1/1686; G06F 1/163
See application file for complete search history.

(56) References Cited

U.S. PATENT DOCUMENTS

| | | | |
|---|---|---|---|
| 9,195,067 B1 | 11/2015 | Heinrich et al. | |
| 9,553,625 B2 | 1/2017 | Hatanaka et al. | |
| 10,331,083 B1 | 6/2019 | Ness et al. | |
| 10,432,839 B2 | 10/2019 | Frank et al. | |
| 2002/0085843 A1 | 7/2002 | Mann | |
| 2003/0019931 A1 | 1/2003 | Tsikos et al. | |
| 2003/0133008 A1 | 7/2003 | Stephenson | |
| 2004/0215958 A1 | 10/2004 | Ellis et al. | |
| 2007/0279852 A1 | 12/2007 | Daniel et al. | |
| 2008/0081968 A1 | 4/2008 | Numada et al. | |
| 2011/0044031 A1* | 2/2011 | Zaksenberg | F21L 4/04 362/157 |
| 2012/0331201 A1 | 12/2012 | Rondel | |
| 2013/0107674 A1* | 5/2013 | Gossweiler, III | G04G 17/06 368/10 |
| 2013/0215281 A1 | 8/2013 | Hobby et al. | |
| 2013/0335546 A1* | 12/2013 | Crane | G06F 3/013 348/78 |
| 2014/0009606 A1 | 1/2014 | Puccio | |
| 2014/0168355 A1 | 6/2014 | Pillarisetty et al. | |
| 2014/0313128 A1 | 10/2014 | Golko et al. | |
| 2015/0223355 A1 | 8/2015 | Fleck et al. | |
| 2016/0029778 A1 | 2/2016 | Fitzgerald et al. | |
| 2016/0283809 A1 | 9/2016 | Rice et al. | |
| 2016/0291550 A1 | 10/2016 | Chen et al. | |

OTHER PUBLICATIONS

Aggarwal, Y., U.S. Appl. No. 15/435,596, Office Action 1, dated Sep. 26, 2018, 16 pages.

Lee, E., International Application No. PCT/US2016,034919, Search Report and Written Opinion, dated Aug. 24, 2016, 13 pages.

"5.11 SR H3 Headlamp," primitivesurvivors.com, http://shop.primitivesurvivors.com/collections/lights/products/5-11-sr-h3-headlamp?variant=9. Accessed May 31, 2016, 2 pages.

"Chesty (Chest Harness)," gopro.com, shop.gopro.com/mounts/chesty-chest-harness/GCHM30-001.html. Accessed Feb. 14, 2017, 1 page.

"Digicamhelp: Digital Camera Help for Beginners & Beyond," Digicamhelp.com, http://www.digicamhelp.com/learn/working-with-light/laser/. Accessed Jan. 17, 2017, 4 pages.

"Head Strap + QuickClip," gopro.com, shop.gopro.com/mounts/head-strap-plus-quickclip/ACHOM-001.html. Accessed Feb. 14, 2017, 1 page.

"TL900 Tactical LED Headlamp," primitivesurvivors.com, http://shop.primitivesurvivors.com/collections/lights/products/tl900-led-headlamp?variant=111. Accessed May 31, 2016, 3 pages.

"The Strap (Hand + Wrist + Arm + Leg Mount)," gopro.com, shop.gopro.com/mounts/the-strap-hand-plus-wrist-plus-arm-plus-leg-mount/AHWBM-001.html. Accessed Feb. 14, 2017, 1 page.

Samsung Galaxy Gear, Mobile Device User Manual, Samsung Telecommunications America, LLC, 2013, 83 pages.

\* cited by examiner

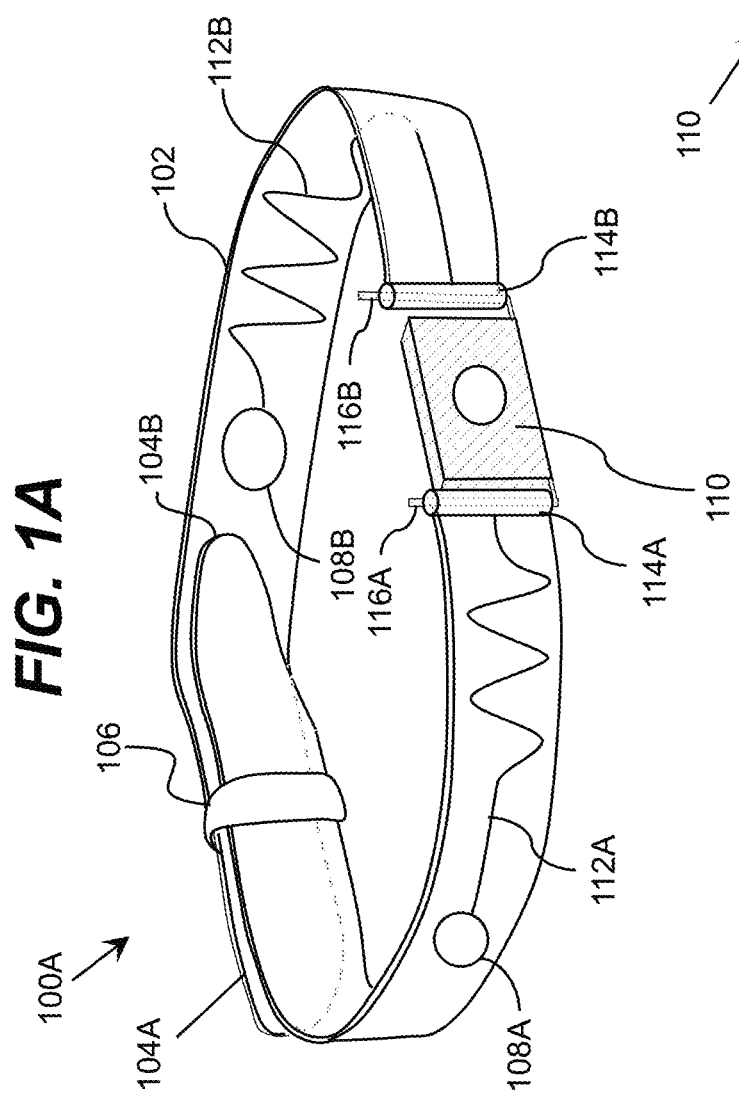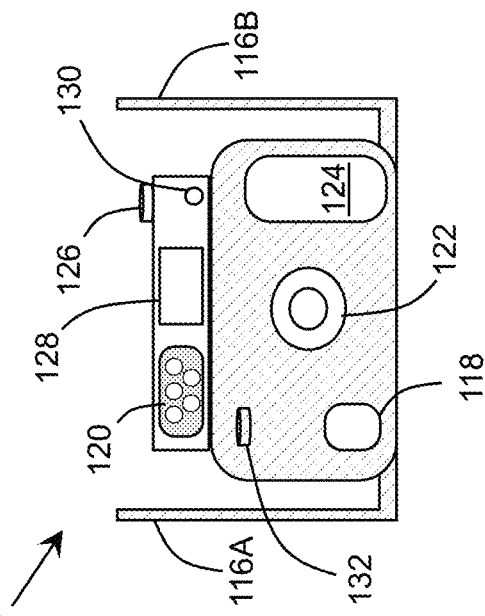

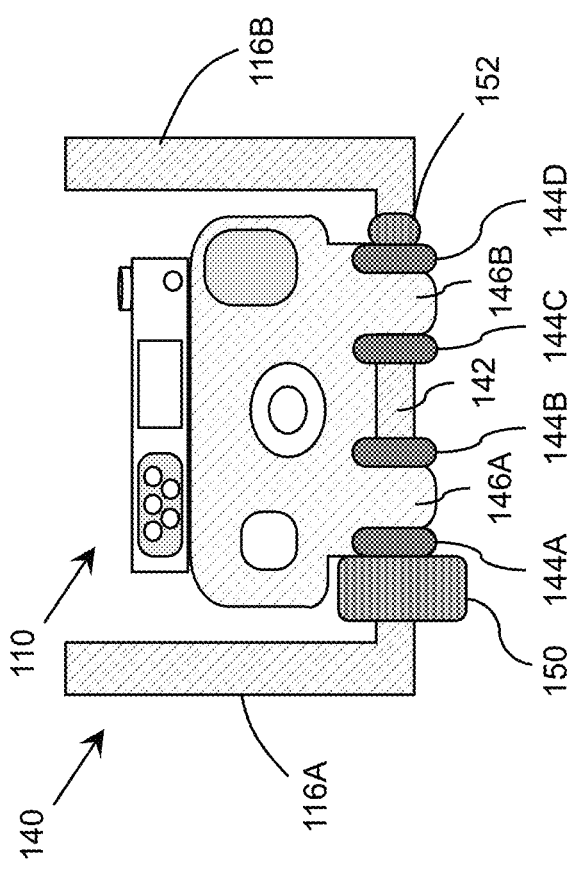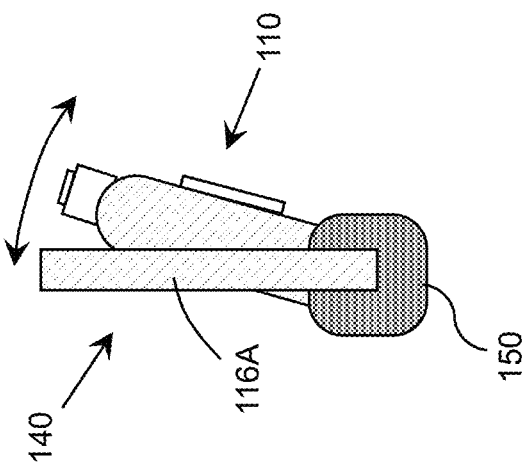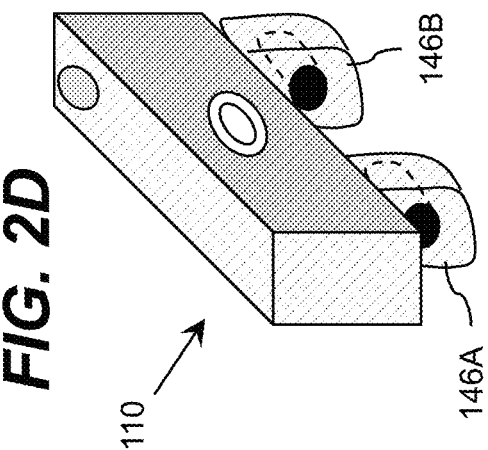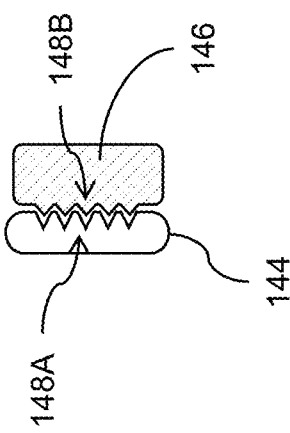

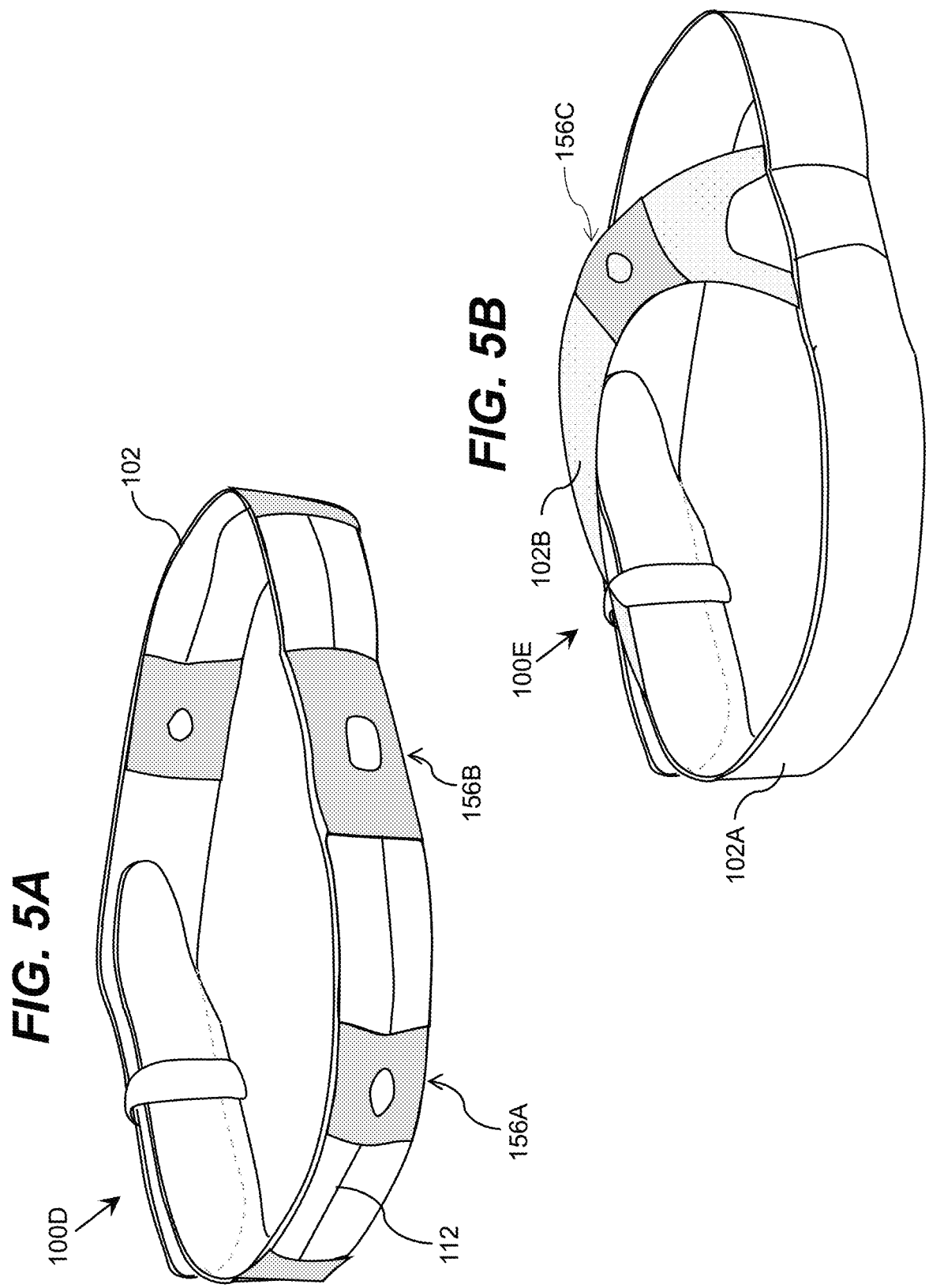

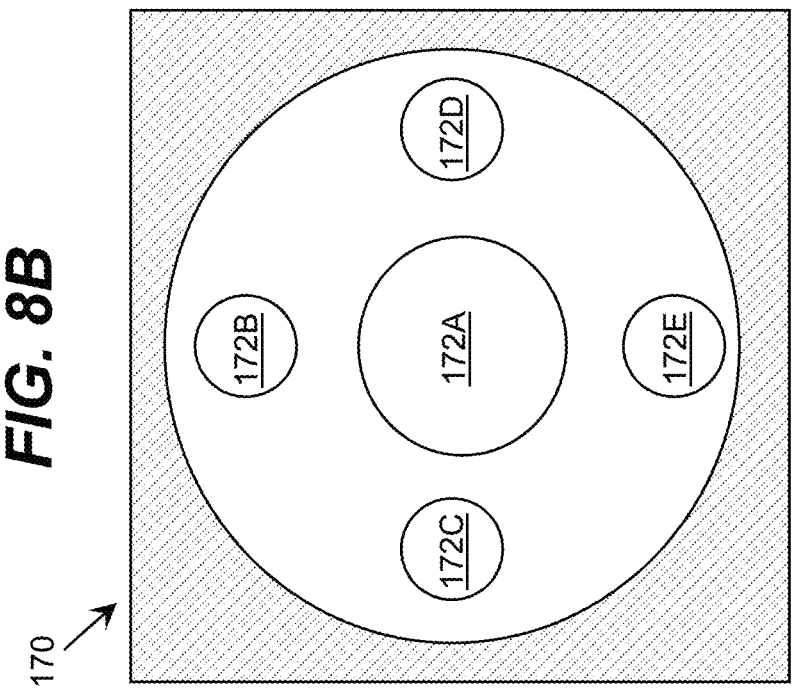
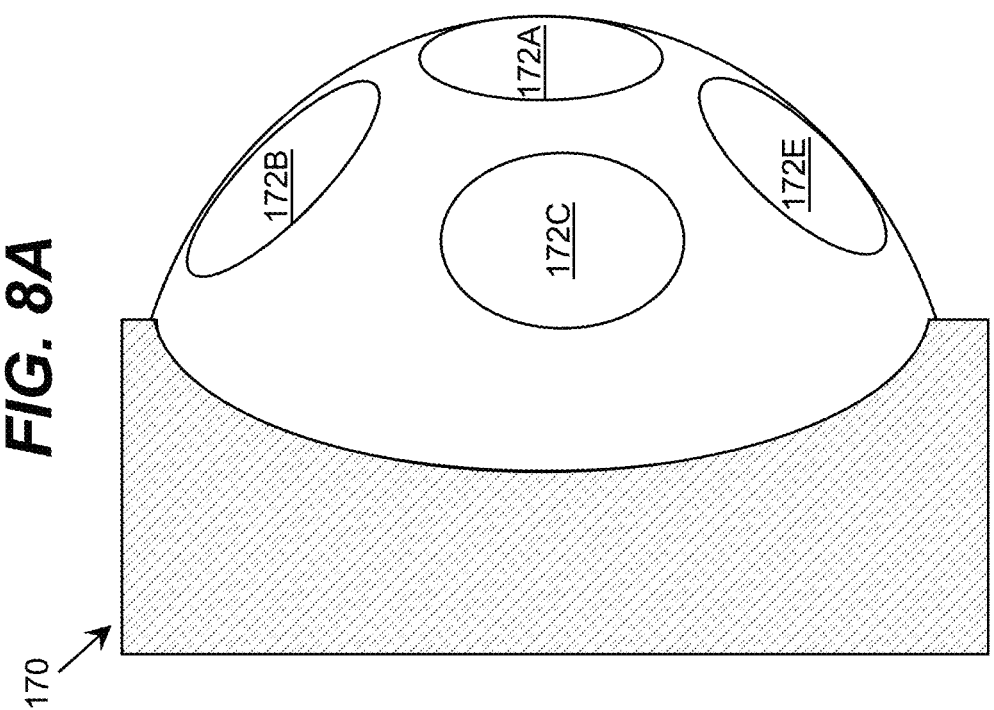

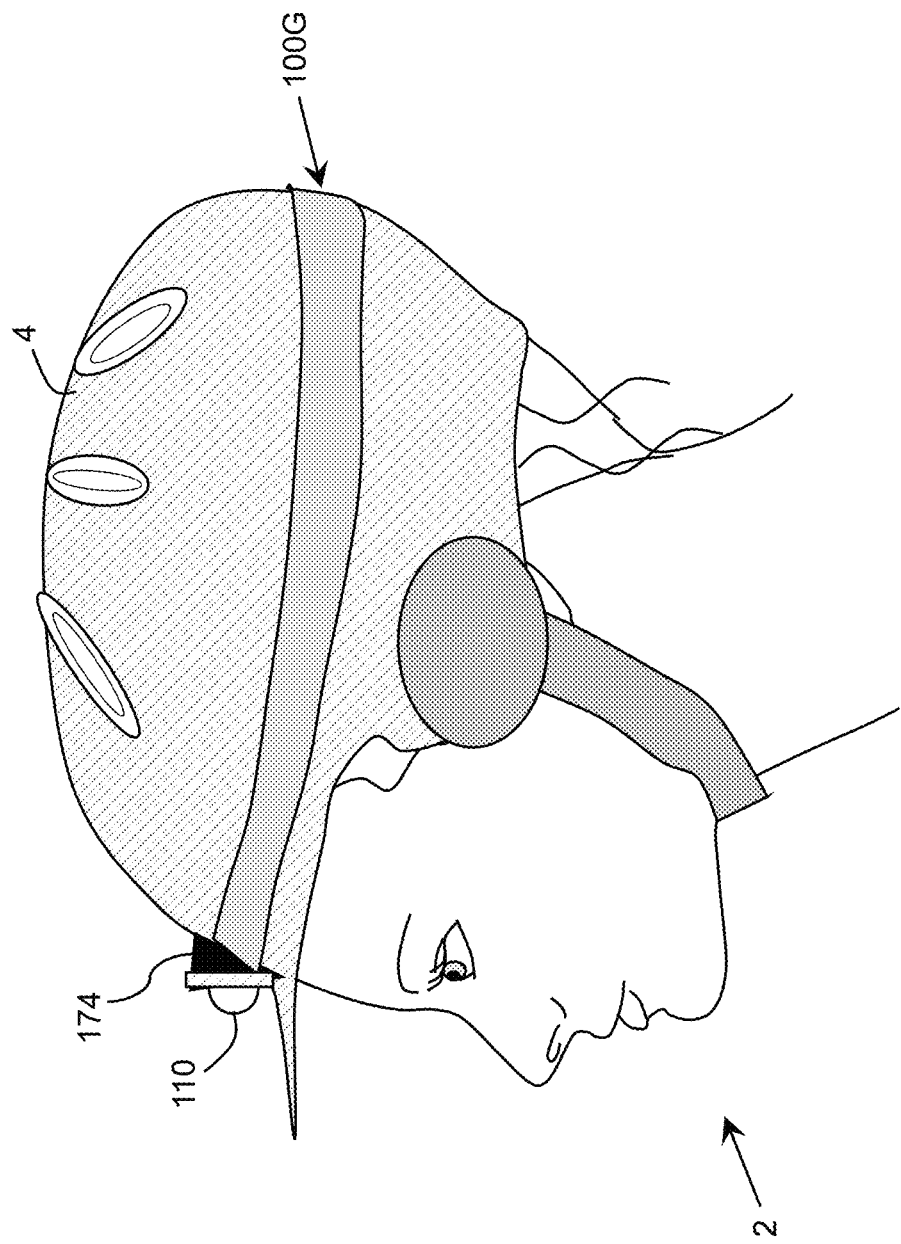

WEARABLE DEVICE

REFERENCE TO RELATED APPLICATIONS

The current application is a continuation of U.S. patent application Ser. No. 15/435,596, filed 17 Feb. 2017, which is a continuation-in-part of International Application No. PCT/US2016/034919, filed 30 May 2016, which claims the benefit of U.S. Provisional Application No. 62/168,802, filed on 30 May 2015, and U.S. Provisional Application No. 62/200,721, filed on 4 Aug. 2015, all of which are hereby incorporated by reference.

TECHNICAL FIELD

The present invention pertains to electronic devices, and more particularly to a solution for a portable and wearable electronic utility strap, embodiments of which can be particularly configured for acquiring image data.

BACKGROUND ART

Currently, with the increasing popularity of wearable electronics, there is an increased desire to convert various electronic devices such as cameras, flashlights, microphones, electronics power supply, memory elements, network devices (Wi-Fi, Bluetooth and cellular), switches, and/or the like, into wearable components. Traditional cameras have given way to digital cameras, which, in turn, have given way to smart phone cameras. Currently, wearable cameras and cameras with various mounting formats have emerged as a means to place a camera module closer to action and at a perspective that is necessary for the sport or activity it is meant to capture.

However, current wearable cameras suffer from a number of shortcomings. For example, a wearable GoPro® Hero camera depends on a mounting element located on the bottom of the camera and a mounting device which has been fastened to a base element. This requires a user to implement many mounting devices in advance of using the mountable camera. In addition, the GoPro® Hero camera contains all the needed electrical components within the same enclosure as the camera, which results in a bulky device.

Another approach provides a minimal camera operated by remote control and depicts a mounting element and base with its own mounting device. Again, the mounting module must be anticipated and attached to an object before the camera can be mounted onto the mounting module. Other wearable camera strategies that don't allow for moving between mounting to a base element rely instead on designing the camera in such a way that it can only be mounted on a specific body part: an earpiece (e.g., Looxcie®) or into glasses (e.g., Google® Glass).

Electronic devices, such as smart phones and personal computers, have image processing and application services. However, these devices do not offer convenience for taking pictures or shooting videos for many activities including any form of athletics, assisted reading, surgery, repair work involving streaming video of handy work, and, in a military sense, surveying a battle field.

Other problems that plague the modern wearable cameras include a poor ability to control and monitor the precise direction of the camera, and ability to capture a wide angle images without relying on an ultra-wide-angle fisheye lens that produces strong visual distortion.

SUMMARY OF THE INVENTION

In view of the above, the inventor recognizes a need to secure a camera module to any location (e.g., any physical body part or any object) without any pre-existing base element in a manner that is exceptionally tight to ensure camera stability and security under high action and possibly difficult conditions (e.g., wind, over/under water, and/or the like). The camera's image processing can be complemented by a smart phone or computer application capable of processing the images into still, stored video or streaming video formats necessary for live-interaction with other apps such as screen or book readers, or other individuals coordinating with the camera operator.

The inventor has identified various challenges and limitations of current approaches for portable wearable electronics. For example, the inventor has noted that current approaches do not utilize a flexible band containing multiple embedded wearable electronic devices that can be easily added to the flexible band through the sockets supporting electronic connection. Additionally, the current approaches tend to produce a closed non-expandable system incorporating all the needed electronics into a single non-distributed module which results in a bulky electronic device, or an electronic device that has limited power, storage, or other functionality. The present aspects of the invention provide a flexible strap capable of attachment of portable wearable electronic devices designed for a comfortable and user-friendly experience.

Aspects of the invention provide an electronic utility strap. The strap includes one or more bands, which can be formed of a flexible material, and can include one or more embedded conductive elements. The strap also can include a power source, which can be temporarily attached to the strap or embedded therein. One or more electronic components can be attached to the strap and electrically connected to one or more of the conductive elements. The electronic components can include single use components, which receive power from the power source and operate in conjunction with other electronic components separately attached to the strap.

A first aspect of the invention provides an electronic utility strap comprising: a flexible band; a set of conductive elements embedded in the flexible band; and a plurality of connection points to the set of conductive elements, wherein the plurality of connection points are spaced along the flexible band. A more particular embodiment of the strap comprises a camera strap with an image capture sensor and an optical system for forming an image of a scene on the image capture sensor mounted inline with the flexible band and a data storage device for storing image data acquired by the image capture sensor mounted inline with the flexible band.

A second aspect of the invention provides a system comprising: an electronic utility strap comprising: at least one flexible band; a plurality of conductive elements embedded in the at least one flexible band; a plurality of connection points to the plurality of conductive elements, wherein the plurality of connection points are spaced along the at least one flexible band; at least one power source attached to the at least one flexible band, wherein the at least one power source is electrically connected to at least one of the plurality of conductive elements; and a wireless communications device physically attached to the at least one flexible band and electrically connected to the plurality of conductive elements, wherein the wireless communications device is physically distinct from the at least one power source and is powered by the at least one power source. A related embodiment provides an image acquisition strap, with or without the wireless communications device, which includes an image capture sensor connected to at least one of the plurality of connection points and an optical system for forming an image of a scene on the image capture sensor; a data storage device connected to at least one of the plurality of connection points, wherein the data storage device is configured for storing image data acquired by the image capture sensor; and a set of light sources, wherein the optical system and at least one of the set of light sources is located inline with the flexible band.

A third aspect of the invention provides an imaging system comprising: an electronic utility strap comprising: at least one band; a plurality of conductive elements embedded in the at least one band; a plurality of connection points to the plurality of conductive elements, wherein the plurality of connection points are spaced along the at least one band; at least one power source attached to the at least one band, wherein the at least one power source is electrically connected to at least one of the plurality of conductive elements; a wireless communications device physically attached to the at least one band and electrically connected to the plurality of conductive elements, wherein the wireless communications device is physically distinct from the at least one power source and is powered by the at least one power source; an imaging device including an image capture sensor for acquiring image data and an optical system for forming an image of a scene on the image capture sensor, wherein the imaging device is physically attached to the at least one band and electrically connected to the plurality of conductive elements; and a data storage device for storing the image data acquired by the image capture sensor, wherein the data storage device is physically separate from the imaging device and is physically attached to the at least one band and electrically connected to the plurality of conductive elements. A related embodiment provides an image acquisition strap, with or without the wireless communications device, which includes a set of light sources, at least one light source in the set of light sources including a laser.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 1A shows a perspective view of an illustrative electronic utility strap according to an embodiment, while FIG. 1B shows an illustrative electronic device for use in conjunction with the utility strap according to an embodiment.

FIGS. 2A-2D show further details of an electronic device mounting unit according to an embodiment.

FIGS. 5A and 5B show illustrative electronic utility straps according to embodiments.

FIGS. 8A and 8B show side and front views, respectively, of an illustrative imaging device according to an embodiment.

FIG. 10 shows an illustrative electronic utility strap mounted on a helmet of a user according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 3:
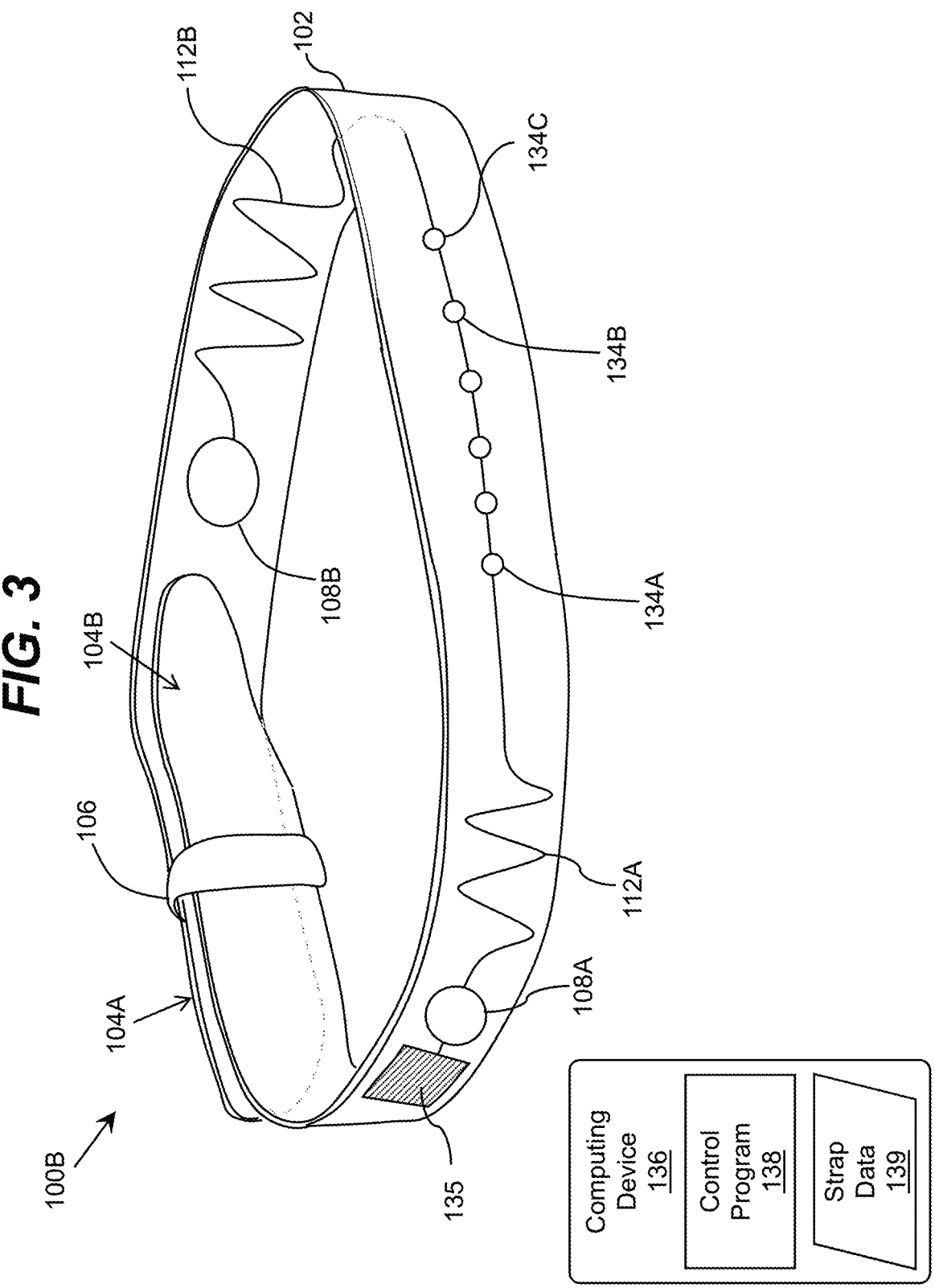
FIG. 3 shows an illustrative electronic utility strap according to another embodiment.

As indicated above, aspects of the invention provide an electronic utility strap. The strap includes one or more bands, which can be formed of a flexible material, and can include one or more embedded conductive elements. The strap also can include a power source, which can be temporarily attached to the strap or embedded therein. One or more electronic components can be attached to the strap and electrically connected to one or more of the conductive elements. The electronic components can include single use components, which receive power from the power source and operate in conjunction with other electronic components separately attached to the strap. The strap can include an inline imaging device and/or one or more components which can be operated in conjunction with the imaging device.

As used herein, unless otherwise noted, the term "set" means one or more (i.e., at least one) and the phrase "any solution" means any now known or later developed solution. As used herein, an object is "flexible" when it has sufficient elasticity such that a stretching force can stretch the object (e.g., a band described herein) to a length at least five percent larger than a normal length of the object without the stretching force being applied, and the object returns to the normal length when the stretching force is no longer applied for a meaningful number of applications of the stretching force (i.e., at least fifty applications). In a more particular embodiment, the flexible material has sufficient elasticity to enable stretching to a length between ten percent and twenty-five percent larger than the normal length.

Turning now to the drawings, FIG. 1A shows an illustrative electronic utility strap 100A according to an embodiment. The strap 100A includes a flexible band 102 that provides universal mounting for electronic devices attached thereto. The electronic device can be mounted in-line with the flexible band 102. An electronic device can include any electronic device, such as a digital camera, a microphone, a light (e.g., a flashlight, camera flash, ambient light, and/or the like), a laser, a speaker, a motion sensor, a body function sensor, an environmental sensor, and/or the like. In the embodiment shown in FIG. 1A, the electronic device 110 is a camera. The flexible band 102 can be made of any combination of one or more materials that is flexible enough to conform to an object to which the strap 100A is secured. For example, the flexible band 102 can be made of leather, nylon webbing, spandex, cotton fabric, a retractable element, and/or the like. In an embodiment, a band 102 can be fabricated from multiple materials, where some materials (e.g., sections of the band 102) are flexible and other materials (e.g., other sections of the band 102) are not flexible.

The strap 100A can be secured to any type of object and/or location. For example, in an illustrative application, the strap 100A can be secured to any physical body part of a user (e.g., leg, calf, chest, head, arm, shin, waist, and/or the like). The strap 100A can be implemented as a belt, with the electronic device 110 being incorporated directly into a belt buckle or being pluggable into the belt or the belt buckle, or as part of a wearable watch. The flexible band 102 can include a first end 104A and a second end 104B to form a belt-like configuration. To this extent, the strap 100A can have any length. The first end 104A and the second end 104B can be connected in order to secure the strap 100A to an object. The first end 104A and the second end 104B can be connected by any mechanism, such as hook and loop fasteners, a buckle, a strap holder 106 (formed of the same or a different material than the flexible band 102), and/or the like. In an embodiment, multiple bands 102 can be secured end to end to create a larger strap capable of being secured to a larger object. Similarly, opposing ends of the flexible band 102 can be secured to another object, to create a larger circumference for securing the strap to a desired location of an object. While embodiments of the band 102 are illustrated as having detachable ends 104A, 104B, it is understood that an embodiment of the band 102 can have ends 104A, 104B permanently attached to one another (e.g., via sewing, glue, and/or the like).

The strap 100A can include an embedded power system for providing power to the electronic device(s) attached thereto. For example, the strap 100A is shown including a set of batteries 108A, 108B for providing power to the electronic device 110 (e.g., camera). The set of batteries 108A, 108B can be connected to the flexible band 102 using any solution. For example, the set of batteries 108A, 108B can be placed within a specially designed pocket with the flexible band 102. The set of batteries 108A, 108B can be electrically connected via a conductive element 112A, 112B to the electronic device 110. The conductive element 112A, 112B can be embedded within the flexible band 102 and can comprise any type of conductive element including wiring, electrodes, conductive ink, and/or the like. As illustrated, the conductive element 112A, 112B can be embedded in a manner that allows the conductive element 112A, 112B to accommodate a longer length of the flexible band 102, e.g., while it is stretched. For example, the conductive element 112A, 112B can be embedded with excess length that is configured to accommodate the longer length of a stretched flexible band 102.

The electronic device 110 can be attached to the flexible band 102 using any solution. In an embodiment, the flexible band 102 includes a generic mounting system, which can be configured to enable mounting of any of various electronic devices to the flexible band 102. For example, in FIG. 1A, the flexible band 102 can include a pair of openings 114A, 114B that are configured to hold a corresponding pair of poles 116A, 116B for mounting the electronic device 110. It is understood that the flexible band 102 can include any number of pairs of openings 114A, 114B, which can enable selective attachment of any number of electronic devices 110 in the flexible band 102. Furthermore, a pair of adjacent poles 116A, 116B can be used to extend a length of the strap 100A by attaching two segments of the flexible band 102 together.

While the electronic device 110 is shown attached to the flexible band 102 using a mounting system that allows removal of the electronic device 110 from the band 102, it is understood that embodiments of the strap 100A include the electronic device 110 permanently affixed to the flexible band 102 using any solution. Furthermore embodiments of the strap 100A can be implemented without any conductive elements or embedded power systems separate from that of the embedded electronic device 110. Still further, while the strap 100A is shown including a single electronic device 110 which comprises a camera, it is understood that embodiments of the strap 100A can include any combination of one or more of various types of electronic devices, which can be temporarily or permanently affixed to a flexible band described herein. An illustrative combination of devices includes a camera and a flashlight. Other illustrative combinations include a flashlight with a separate power supply component, a camera and flashlight with separate power, data storage, and data transfer components, and/or the like.

Regardless, it is understood that the strap 100A can be attached using the flexible band 102 to any object. In an embodiment, the object can be selected such that it is capable of allowing a tight and secure support of the flexible band 102 in a steady position that does not allow the flexible band 102 to move in any direction or change orientation due to movement of the object. For example, the flexible band 102 can be wrapped around a physical body part, such as a head, a helmet, a waist, a chest, a shin, a leg, a calf, an arm, and/or the like. In another embodiment, the flexible band 102 can be wrapped around a non-physical body, such as the bicycle steering bar, head tube or bars of a bike, a pole, a selfie stick, a stone, a tree, an animal, a drone, a ski rack, a rollerblade, a ball, an ice skate, a remote control car, and/or the like.

Turning to FIG. 1B, an illustrative electronic device 110 according to an embodiment is shown. The electronic device 110 has a mounting unit including a first pole 116A located at one side of the device 110 and a second pole 116B located at an opposite side of the device 110, which enables the electronic device 110 to be mounted to the flexible band 102 (FIG. 1A). The electronic device 110 can include various components for operation. For example, in an embodiment, the electronic device 110 can include a battery 118. The battery 118 can be a small rechargeable battery unit that can support the operations of the electronic device 110 for a period of time. The size of the battery 118 can be small enough to maintain a lightweight design of the electronic device 110 and the strap 100A including the electronic device 110. If the electronic device 110 does not include a battery 118, or if the battery 118 does not have sufficient battery life, the electronic device 110 can be powered by the set of batteries 108A, 108B via the set of electrodes 112A, 112B embedded within the flexible band 102, e.g., via a plug located on the electronic device 110 which enables the device 110 to be physically connected to the electrodes 112A, 112B.

As discussed herein, the electronic device 110 can comprise an imaging device, such as a digital camera. The imaging device can contain an image capture sensor for acquiring a digital image and an optical system for forming an image of a scene on the image sensor. To this extent, the electronic device 110 can include an objective 122 containing a lens, a shoot button 126 for manual operation of the imaging device, on board data storage 132, and/or the like.

The electronic device 110 can include a set of light generating components 120. For example, the light generating components 120 can include one or more light sources configured to operate as a flash lamp in conjunction with an imaging device also included in the electronic device 110. Furthermore, the light generating components 120 can include one or more light sources for visually indicating a direction of the field of view of the imaging device. For example the light generating components 120 can include a set of lasers, which emit a set of laser beams corresponding to the field of view of the imaging device. In an illustrative embodiment, the light generating components 120 include a plurality of lasers configured to generate laser beams that frame a field of view of the electronic device 110. In this case, even when the strap 100A is attached to a body part that would not allow a user to use a viewfinder on the electronic device 110 in order to determine what kind of image the electronic device 110 is capturing, the set of light generating components 120 can form a frame box that shows the user an approximate area that is within the frame. In another embodiment, the light generating components 120 can include at least one laser configured to generate a pattern of light directed toward a central region of the field of view of the electronic device 110. In this case, the laser light can provide information that assists the user in centering the field of view and/or can assist the electronic device 110 in auto-focusing. In an embodiment, in response to the user requesting an image capture (e.g., by pressing the shoot button 126), the plurality of lasers can cease creating the frame box so that the image captured by the electronic device 110 does not include the frame box.

The set of light generating components 120 can include any combination of various types of light emitting devices. The set of light generating components 120 can include any combination of different types of light sources and any number of each type of light source. The set of light generating components 120 can be configured to emit light at a preferred wavelength and in a preferred direction. Illustrative light emitting devices include, for example, ultra-bright light emitting diodes, laser diodes, and/or the like. The set of light generating components 120 can operate in different modes, with each mode characterized by the intensity of the emitted light and the peak wavelength of the emitted light. For example, the set of light generating components can comprise several light emitting diodes, where each light emitting diode can operate in several different modes independently of the mode of operation of other light emitting diodes, with each mode characterized by the intensity of the emitted light and the peak wavelength of the emitted light. In an embodiment, the set of light generating components 120 can be configured to be operated as one or more of a flashlight, a laser sighting, night vision lamp, and/or the like. Such functionality, which generally require higher amounts of power to operate for a meaningful amount of time, can be supported, for example, by the strap 100A providing additional power via the batteries 108A, 108B. In an embodiment, the set of light generating components 120 can include one or more sources of diffuse light having an adjustable spread of the light. To this extent, the light source can emit light that is more focused (e.g., similar to a spotlight) spreads over a wider area. In a more particular embodiment, the spread of the light emitted by the light source can be adjusted along with a zoom level of an imaging device. To this extend, the spread of the light can correlate with the zoom level of the imaging device. Adjustments to the spread of light emitted by the light source(s) and/or the zoom level of the imaging device can be implemented using any solution, such as a handheld remote operable by a user.

Additionally, the electronic device 110 can include one or more output devices configured to convey information regarding the operating status of one or more components of the electronic device 110. For example, the electronic device 110 can include a set of indicators 130 configured for providing a visual indication when one or more components of the device 110 is in use. In an embodiment, the electronic device 110 includes one or more of: an indicator for showing that the imaging device is powered; an indicator for showing the status of a flash light; an indicator for showing a data connection status; and/or the like.

Furthermore, the electronic device 110 can include other components for enabling interaction with the electronic device 110 by an operator when the electronic device 110 is mounted in a location not readily viewable or accessible by the user. To this extent, the electronic device 110 is further shown including a communication system 124 configured for wireless and/or wired communications and a Bluetooth network system 128. However, it is understood that embodiments of the electronic device 110 can include different communication systems and/or only one communication system.

FIGS. 2A-2D show further details of an electronic device mounting unit according to an embodiment. In this case, the mounting unit 140 includes a pair of side poles 116A, 116B physically connected by a cross bar 142, which extends between the poles 116A, 116B and is perpendicular thereto. The electronic device 110 is connected to the cross bar 142 of the mounting unit 140 using a set of connecting elements 144A-144D and a set of leg elements 146A, 146B of the electronic device 110. The mounting unit 140 can include a bolt head 150 and a nut element 152, which can be operated to create pressure on the elements 144A-144D and 146A-146B when tightened thereby fixing the electronic device 110 in a position relative to the poles 116A, 116B. Similarly, the bolt head 150 and nut element 152 can be operated to reduce pressure on the elements 144A-144D and 146A-146B to allow adjustment of a position of the electronic device 110 and/or removal of the electronic device 110 from the mounting unit 140. In an embodiment, the cross bar 142 can be detached from one or both poles 116A, 116B, e.g., at a location of the nut element 152, to allow removal of the electronic device 110 from the mounting unit 140. However, it is understood that the electronic device 110 can be permanently secured to the mounting unit 140 in an embodiment.

In an embodiment, the elements 144A-144D and 146A-146B can include one or more additional features for securing the electronic device 110 to the mounting unit 140. For example, as shown in FIG. 2B, immediately adjacent side surfaces of a connecting element 144 and a leg element 146 can have complementary surface texturing 148A, 148B, respectively, which can include, for example, protrusions and/or cavities. The surface texturing 148A, 148B can increase an amount of friction between the elements 144, 146 and can match at various discrete angles or all allowable angles between the connecting element 144 and the leg element 146.

As shown in FIG. 2C, the mounting unit 140 can allow rotation of the electronic device 110 with respect to the orientation of the poles 116A, 116B. In an embodiment, each connecting element 144A-144D and leg element 146A, 146B (as illustrated in FIG. 2D) can have a cylindrical opening sized to fit over a cylindrical cross bar 142 to enable such rotation. For example, the bolt head 150 and/or nut element 152 can be operated to loosen the electronic device 110 enabling rotation to a desired position. Subsequently, the bolt head 150 and/or nut element 152 can be operated to tighten the electronic device 110 to hold it at the desired orientation. It is understood that other connection solutions can be utilized to fix orientation of the electronic device 110 in a desired way. The solution described herein allows "pitch" orientation of the electronic device 110, where "pitch" is used similar to the orientation coordinate describing the revolution of the solid body, typically in aerodynamics. Other orientations of the electronic device 110 can be obtained through, for example, adjusting a position of the strap 102 (FIG. 1) with respect to an object to which it is mounted.

An embodiment of an electronic utility strap described herein can support further distribution of components around the strap. For example, FIG. 3 shows an illustrative electronic utility strap 100B according to another embodiment. Similar to the electronic utility strap 100A shown in FIG. 1A, the strap 100B includes a flexible band 102 having ends 104A, 104B that can be connected to secure the strap 100B to an object. Additionally, the strap 100B is shown including an embedded power system comprising a set of batteries 108A, 108B and conductive elements 112A, 112B.

In an embodiment, the conductive elements 112A, 112B also support communications between two or more electronic components located on the strap 100B. For example, the strap 100B can include multiple electronic components 134A-134C, each of which can perform one or more functions and send and/or receive data via the conductive elements 112A, 112B. Furthermore, the strap 100B is also shown including a wireless communications device 135, which is capable of sending and/or receiving data via a wireless communications solution, such as WiFi, Bluetooth, cellular, and/or the like. In this case, the wireless communications device 135 can enable interaction with the electronic components 134A-134C using a remote I/O device, such as a mobile telephone, a remote control, and/or the like. Illustrative interactions include controlling the operation of an electronic component 134A-134C, receiving data from an electronic component 134A-134C, and/or the like. While a wireless communications device 135 is shown, it is understood that embodiments can include a communications device that supports both wired and wireless communications or a communications device that supports only wired communications (e.g., via a universal serial bus connection).

The strap 100B can include any combination of various types of electronic components 134A-134C. Illustrative electronic components 134A-134C include: a processing unit, a storage device, an imaging device, a microphone, a lighting device, a laser sight, a speaker, a temperature sensor, a pulse sensor, a glucose meter, an environmental sensor (such as wind sensor, pressure sensor, magnetic field sensor, and/or the like), a gas sensor (such as sensor of ozone, carbon monoxide, radon gas, and/or the like), a distance measuring device, a Geiger counter, and/or the like. When configured for attachment to a moving object (e.g., a person, animal, and/or the like), the electronic components 134A-134C can include one or more sensors for acquiring data regarding the motion of the strap 100B, such as an accelerometer, a gyroscope, and/or the like. Additionally, an electronic component 134A-134C can be configured to send and/or receive data transmitted via a wireless communications solution. Such illustrative devices include an electronic tag reader (e.g., an RFID reader), an NFC communication device (e.g., to support payments), and/or the like.

In an embodiment, the strap 100B can include mechanisms for enabling electronic components 134A-134C and/or other components, such as the batteries 108A, 108B, the wireless communications device 135, and/or the like, to be selectively removed and/or replaced. To this extent, each component located on the strap 100B can be physically attached to the strap 102 and/or the conductive elements 112A, 112B using a socket or the like, which allows for subsequent removal of the component and replacement thereof. In this manner, the strap 102 can include a customized set of components configured to provide any of numerous combinations of desired functionality.

In one embodiment, the electronic components 134A-134C include: a set of light sources (e.g., LEDs) 134A; an image sensor 134B containing a lens, shutter, and/or the like, for acquiring image data; and a storage device 134C (e.g., a memory card). Each of the electronic components 134A-134C can receive power from the batteries 108A, 108B, and can be controlled via signals acquired by the wireless communications device 135. Each light source in the set of light sources 134A can be configured to perform one or more desired lighting functions including, for example, illuminating a region to be imaged with light having a preferred wavelength; a flash lamp; emitting a set of laser beams for positioning the image sensor 134B; and/or the like. The image sensor 134B can comprise a digital camera containing an image capture sensor for acquiring a digital image and an optical system for forming an image of a scene on the image sensor.

It is understood that the strap 100B can include any of various additional electronic components 134A-134C, which can be separately implemented or included as part of another electronic component 134A-134C. For example, the strap 100B can include any combination of various output devices indicating a status of a corresponding electronic component 134A-134C. Illustrative status indicators include: an indicator showing a power status for the image sensor 134B; an indicator showing the status of a flash light 134A; an indicator showing a data connection status; and/or the like. Furthermore, the strap 100B can include one or more input devices, which can enable manual operation of an electronic component 134A-134C located thereon, such as an on/off switch for one or more light sources 134A, a manual shoot button for the image sensor 134B, and/or the like.

As discussed herein, one or more of the electronic components 134A-134C located on the strap 100B can be controlled via a wireless solution, which can send and/or receive data via the wireless communications device 135. To this extent, a computing device 136 (such as a general purpose computing device, a mobile telephone device including a general purpose processor, and/or the like) can include a control program 138 executing thereon, which enables the computing device 136 to send and receive data with one or more of the electronic components 134A-134C located on the strap 100B. In particular, the control program 138 can cause the computing device 136 to send one or more control commands, which are received by the wireless communications device 135 and affect the operation of one or more of the electronic components 134A-134C.

Use of a computing device 136 executing a control program 138 can allow for sophisticated control and analysis of data together with receiving the output data from the electronic utility strap 100B. Illustrative operations include adjusting the on/off status or intensity of a light source 134A, controlling the operation of the image sensor 134B, managing data stored on the data storage device 134C (e.g., requesting data, receiving data, and/or deleting data), and/or the like. The control program 138 also can cause the computing device 136 to process data received from one or more of the electronic components 134A-134C, and store data on the computing device as strap data 139. The strap data 139 can include any combination of various types of data that can be generated by the electronic components 134A-134C including, for example, images acquired by an image sensor 134B and/or other types of sensor data including environmental conditions, physiological data, and/or the like.

An embodiment can enable a user to operate one or more of the electronic components 134A-134C using a hands free solution. For example, an electronic component can comprise a motion sensor or other type of sensor, which can generate a signal to one or more of the other electronic components to commence or stop operation. In an embodiment, the computing device 136 can include a voice-activated system that supports voice recognition and/or command recognition. The computing device 136 can be capable of being attached to a user or located nearby and utilized without requiring the user to hold the computing device 136. In an embodiment, the computing device 136 can provide an intermediary for enabling communications between the electronic components 134A-134C on the strap 100B and a larger computer system, such as a desktop system. In this case, the larger computer system can provide further processing and/or management of the strap data 139.

Data acquired by the electronic components 134A-134C on the strap 100B can be processed and analyzed (by a processing unit located on the strap 100B, the computing device 136, another computer system, and/or the like) to adjust the operation of one or more of the electronic components 134A-134C, present information (e.g., a warning) to a user, provide information for remote presentation (e.g., on a website), and/or the like. For example, an electronic component can acquire data regarding the ambient lighting conditions (e.g., a brightness of sunlight), which can be incorporated into an algorithm for adjusting exposure settings for an imaging device attached to the strap 100B. Similarly, the strap 100B can acquire and provide information regarding the levels of UV radiation present in the ambient, the presence of ozone or any other dangerous gases. Furthermore, the strap 100B can inform the user regarding a level of power available on the strap 100B. Each embodiment can be implemented with electronic components 134A-134C containing elements of artificial intelligence, which can be attached to the strap 100B.

Figure 4:
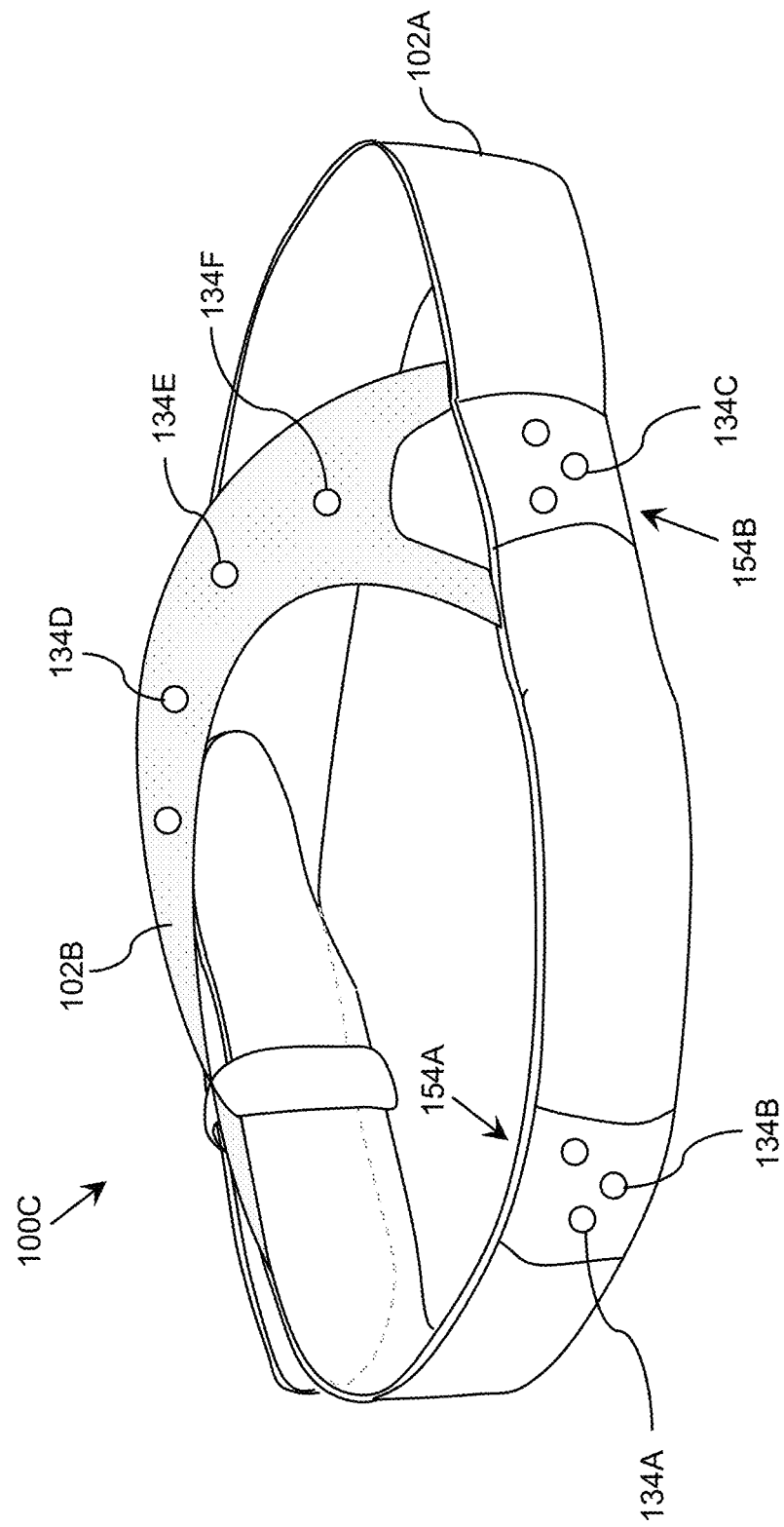
FIG. 4 shows an illustrative electronic utility strap according to still another embodiment.

In an embodiment, an electronic utility strap can include more than one band. To this extent, FIG. 4 shows an illustrative electronic utility strap 100C according to an embodiment. In this case, the electronic utility strap 100C includes a primary band 102A and a supplemental band 102B. The primary band 102A can be configured similar to the other embodiments of bands described herein. The supplemental band 102B can be physically attached to the primary band 102A on opposing ends of the supplemental band 102B using any solution. The supplemental band 102B can be permanently or temporarily secured to the primary band 102A. Illustrative approaches for securing an end of the supplemental band 102B to the primary band 102A include a hook and loop fastener, sewing, glue, snap fastener, and/or the like. In an embodiment, the supplemental band 102B also includes conductive elements which are physically attached to conductive elements included in the primary band 102A, e.g., using a connection point described herein.

As illustrated, the primary band 102A can include various electronic components 134A-134C attached thereto. Additionally, the supplemental band 102B can have one or more additional electronic components 134D-134F attached thereto. It is understood that each electronic component 134A-134F can comprise any electronic component described herein or other suitable electronic component. The electronic components 134A-134F can have any spacing along the bands 102A, 102B, which can be selected based on common functionality, desired angle of view, comfort for a user, and/or the like.

In an embodiment, an electronic utility strap described herein can include one or more clusters of components. For example, the electronic utility strap 100C is shown including a pair of electronic component clusters 154A, 154B. Each cluster 154A, 154B can comprise, for example, a group of related components that can be operated together to provide a desired function. To this extent, an illustrative cluster 154A, 154B can include a camera, a microphone, and a light source. However, it is understood that this is only illustrative of various possible clusters 154A, 154B, which may be desired.

As discussed herein, a device, an electronic component, and/or a cluster thereof, can be secured to an electronic utility strap using any solution. In an embodiment, the electronic utility strap includes one or more pockets for securing the device(s) and/or electronic component(s). To this extent, FIGS. 5A and 5B show illustrative electronic utility straps 100D, 100E according to embodiments. The electronic utility strap 100D is shown including a plurality of pockets 156A, 156B, which can be spaced around the band 102. Each pocket 156A, 156B can include one or more mechanisms for attaching an electronic device located therein to the conductive element 112 included in the band 102. In FIG. 5B, the electronic utility strap 100E is shown including a primary band 102A and a supplemental band 102B, with the supplemental band 102B including at least one pocket 156C. It is understood that straps 100D, 100E are only illustrative of various straps which can include any combination of one or more pockets 156A-156C for securing device(s)/component(s) thereto.

Figure 6A:
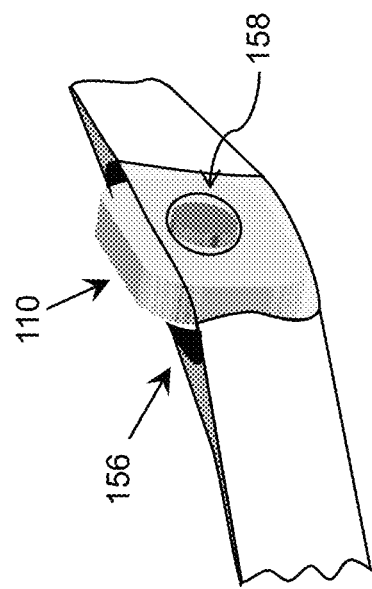
FIGS. 6A-6C show illustrative solutions for connecting a device to an electronic utility strap according to embodiments.

FIG. 6A shows an illustrative pocket 156 in more detail. In this case, the pocket 156 is configured to secure an imaging device 110. To this extent, the pocket 156 is shown including a transparent region 158, which is sized to substantially align with a focal lens of the imaging device 110 when the imaging device 110 is properly located within the pocket 156. Regardless, the device 110 also can include power and data connections for linking the device 110 to corresponding contacts located within the pocket 156.

Figure 6C:
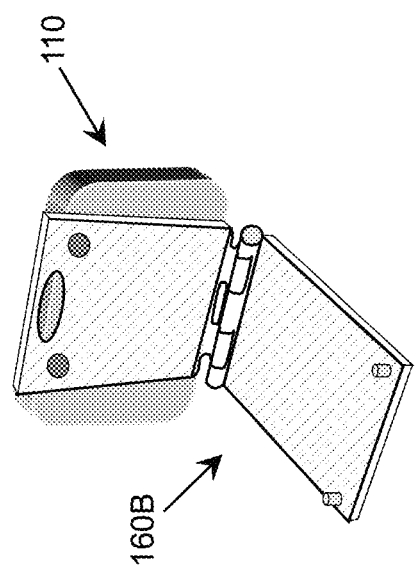
Figure 6B:
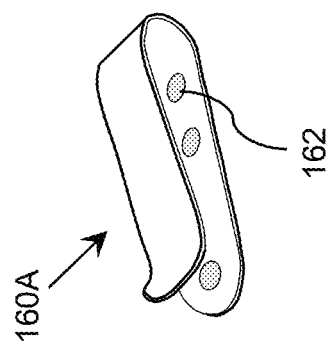

It is understood that the mounting unit and pocket are only illustrative of various solutions for connecting a device to an electronic utility strap described herein. For example, FIG. 6B shows a clip 160A, which can have a component attached thereto, and which can be secured to a band. The clip 160A also can include a set of magnets 162, which can maintain a position of the clip 160A on the band. Additionally, FIG. 6C shows another clip 160B, which can have an electronic component 110 attached thereto and can include a hinged side 164 for enabling selective removal or relocation of the clip 160B on a band described herein.

Figure 7:
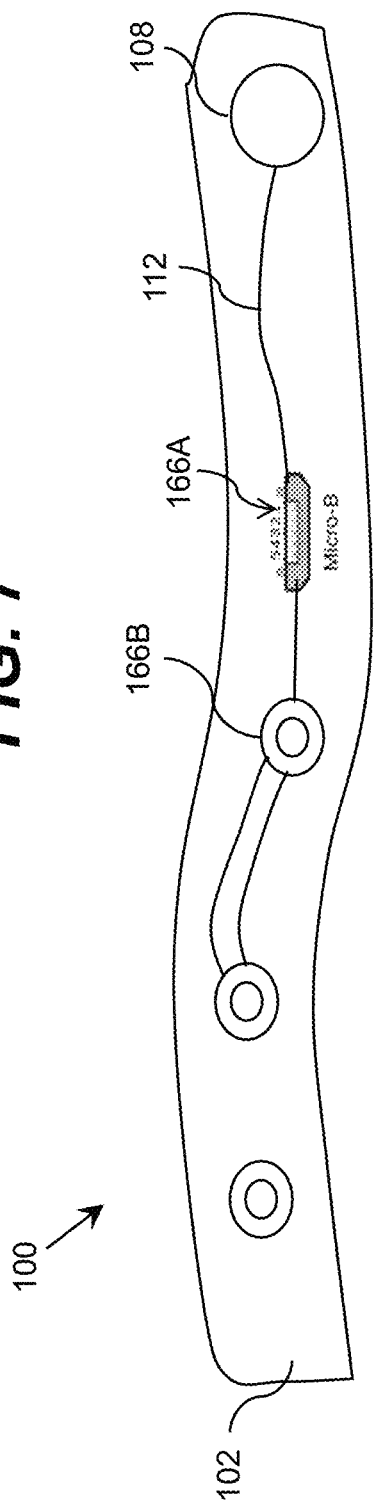
FIG. 7 shows a portion of a band of an electronic utility strap according to an embodiment.

As described herein, the band(s) of an electronic utility strap described herein can include embedded conductive elements as well as a set of connectors for connecting one or more electronic components to the conductive elements. FIG. 7 shows a portion of a band 102 of an electronic utility strap 100 according to an embodiment. As illustrated, the band 102 can include a conductive element 112 (e.g., wiring) and a plurality of connection points 166A, 166B to the conductive element 112. In an embodiment, one or more connection points, such as connection point 166A, comprises a universal serial bus (USB) port. However, it is understood that any type of standard connector can be implemented.

In another embodiment, one or more connection points, such as connection point 166B, comprises a secured electrical connection. The secured connection point 166B can provide a more tight and secure connection for a corresponding electrical component. It is understood that the secured connection point 166B can comprise a "snap-in" socket, where attachment of an electronic device is achieved by pressing a male/female connector attached to the electronic device onto a corresponding female/male connector of the connection point 166B. Device removal is achieved through application of a peeling force, wherein the user is peeling the device off the flexible strap by allying force. In another embodiment, the secured connection point 166B can use a threaded connection for connecting the corresponding device. Regardless, each connection point 166A, 166B can provide a connection to the power and the data in the conductive element 112. In this manner, the flexible strap can be viewed as a motherboard which can accommodate any combination of various electronic devices in a fully integrated environment.

As described herein, the band 102 can include one or more power sources 108. A power source 108 can be connected to the conductive element 112 using a connection point or the power source 108 can be permanently attached to the conductive element 112 and embedded in the band 102. In the latter case, the power source 108 can include a mechanism that enables recharging of the power source 108. For example, the power source 108 can be recharged via connection of an external power source to a connection point, such as the connection point 166A, or the power source 108 can include its own connection point located thereon. Furthermore, the power source 108 can be a power source capable of being recharged using a wireless solution.

Embodiments of the electronic utility strap described herein are particularly suitable for use in conjunction with one or more imaging devices. To this extent, FIGS. 8A and 8B show side and front views, respectively, of an illustrative imaging device 170 according to an embodiment. In this case, the imaging device 170 includes a plurality of objective lenses 172A-172E, which can collectively acquire wide angle image data without the use of a fisheye lens. Each objective lens 172A-172E can be designed to have appropriate characteristics, functionality and options. For example, the objective lens 172A can be designed for capturing high definition video and/or high resolution pictures, while each of the objective lenses 172B-172E can be designed to capture image data at wider angles and/or at a lower definition than the objective lens 172A. The image data acquired using the objective lenses 172A-172E can be re-constructed into image data for a single wide angle image and/or image data for a portion of the overall image using any solution. The resulting image data will not have the typical distortion caused by a wide angle lens.

It is understood that various alternative configurations can be implemented. In another embodiment, the objective lens 172A can comprise a regular lens, while each of the objective lenses 172B-172E comprises a wide angle lens. In still another embodiment, the optical quality of the objective lenses 172A-172E differs. For example, objective lenses 172B-172E can contain a lower quality optics, as they are designed to capture the peripheral image, while the objective lens 172A has a higher quality optics. In another embodiment, the objective lenses 172A-172E (and corresponding sensors) can be configured to acquire image data corresponding to differing wavelengths of radiation. For example, illustrative ranges of wavelengths include visible light, UVA, UVB, UVC, and infrared spectra. In an illustrative embodiment, the imaging device 170 can combine night vision functionality obtained through the use of objective lenses 172B-172E and a day vision functionality provided by the objective lens 172A to acquire colorful, yet sharp images in dim ambient light. While a particular number and arrangement of objective lenses 172A-172E is shown for illustration, it is understood that more or less objectives can be utilized with any suitable arrangement.

Figure 9:
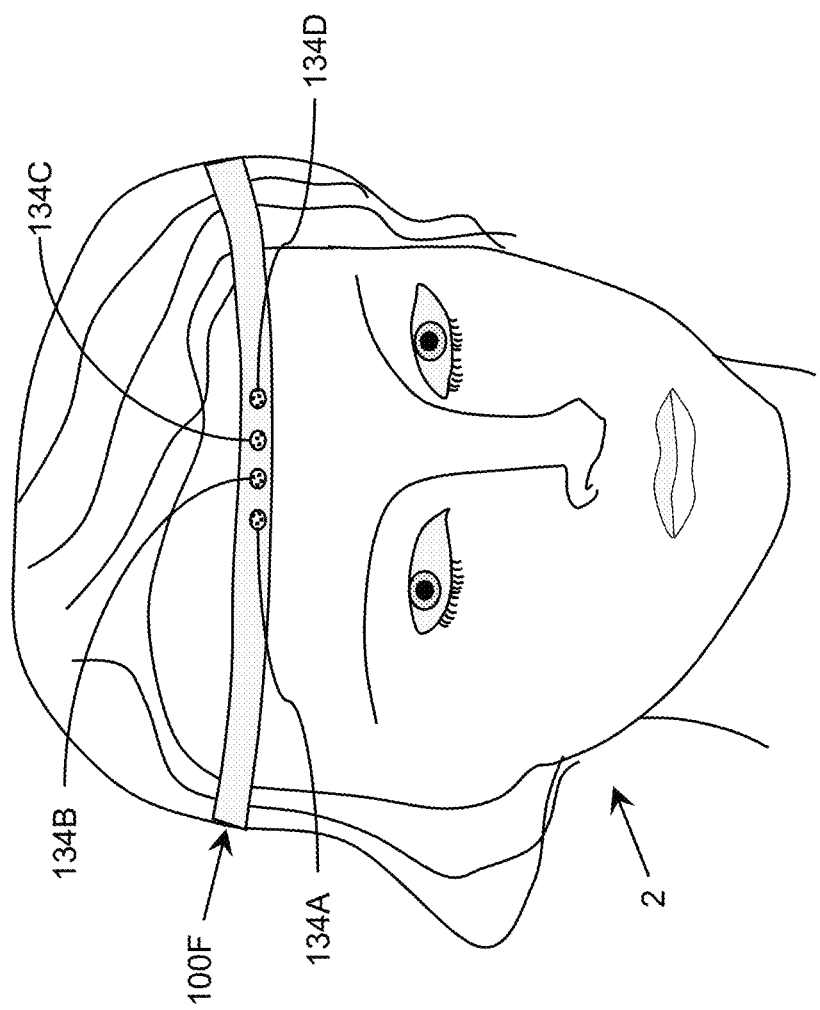
FIG. 9 shows a user wearing an illustrative electronic utility strap according to an embodiment.

In an illustrative embodiment, an electronic utility strap described herein can be configured for placement on a head of a user. To this extent, FIG. 9 shows a user 2 wearing an illustrative electronic utility strap 100F according to an embodiment. As illustrated, the strap 100F can form a bandana-like article, which includes a relatively small overall thickness, resulting in an overall improvement to an aesthetic appearance and/or ease for wearing the strap 100F. A small overall thickness can be achieved by a distribution of electronic components 134A-134D included on the strap 100F as described herein. For example, the electronic components 134A-134D can include: an imaging device; a flash; a storage component; a microphone; a light source; a laser source; and/or the like, each of which can be separately located on the strap 100F using a solution described herein.

FIG. 10 shows an illustrative electronic utility strap 100G mounted on a helmet 4 of a user 2 according to an embodiment. In this case, the strap 100G is shown including an imaging device 110 mounted thereto. The imaging device 110 can be mounted to the strap 100G using a rotatable mounting solution described herein. In this manner, the imaging device 110 can be angled to acquire image data from a desired field of view regardless of an resulting angle of the strap 100G on the helmet 4. Alternatively, an additional component, such as a wedge element 174, can be placed between the helmet 4 and the imaging device 110 to provide support for the imaging device 110 and to allow the imaging device 110 to maintain a desired field of view. In an embodiment, such a wedge element 174 can be designed to have a variable wedge angle and/or to be directly connected to the strap 100G (e.g., using a hook and loop fastener, straps, and/or the like). In addition, a strap described herein can be provided with several alternative wedge elements 174, or a desired wedge element 174 can be separately obtained by the user 2.

In an embodiment, an electronic utility strap described herein includes various components for acquiring a series of images and/or video, e.g., while a user 2 is performing an activity while wearing the electronic utility strap. FIGS. 11A-11D show illustrative features of an electronic utility strap 100H for acquiring image and/or video data according to an embodiment. In this embodiment, the strap 100H is shown placed on a head of the user 2. However, it is understood that this placement is only illustrative of various possible locations to which the strap 100H can be secured on a user 2, an animal, an object, and/or the like.

Figure 11A:
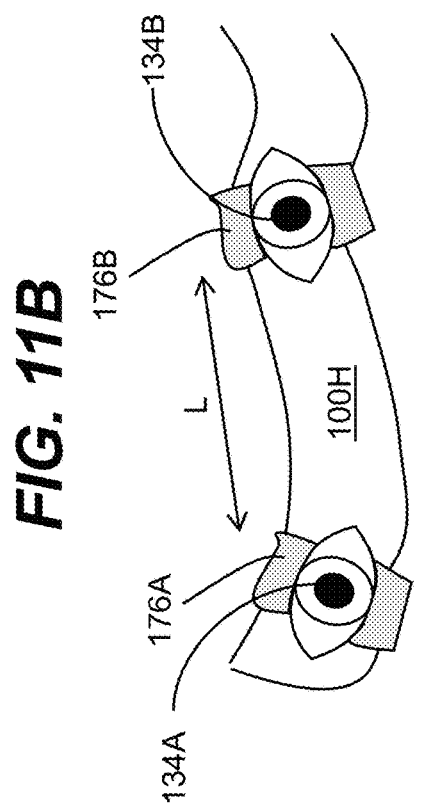
FIGS. 11A-11D show illustrative features of an electronic utility strap for acquiring image and/or video data according to an embodiment.
Figure 11B:
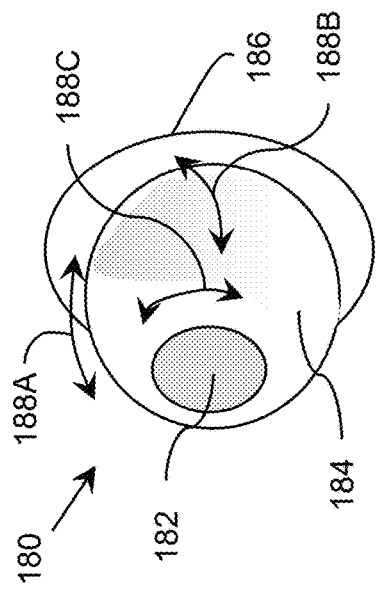
Figure 11C:
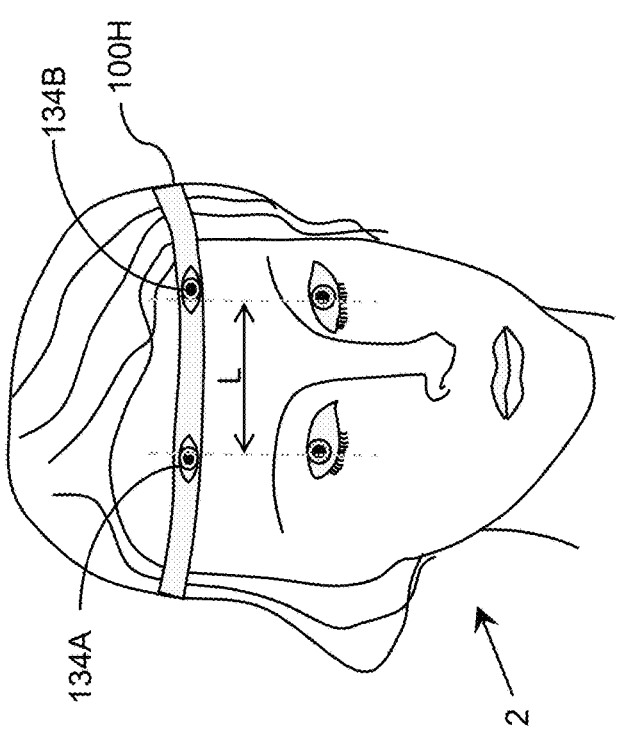

Regardless, the strap 100H is shown including two imaging devices 134A, 134B. As illustrated, the imaging devices 134A, 134B can be positioned on the strap 100H in a manner that approximates the distance L between the eyes of the user 2. In an embodiment, the distance L can be adjusted for different users 2 using any solution. For example, as shown in FIG. 11B, each imaging device 134A, 134B can be secured to the strap 100H using a movable clip 176A, 176B, which can allow at least some lateral movement of the imaging devices 134A, 134B along the strap 100H (e.g., limited by a physical attachment of each imaging device 134A, 134B to the conductive element in the strap 100H), thereby adjusting the distance L between the imaging devices 134A, 134B. In an embodiment shown in FIG. 11C, the strap 100H can be lengthened or shortened using a clip mechanism 178 located between the imaging devices 134A, 134B, thereby providing adjustment of the distance L.

In other embodiments, a strap described herein can include a clip mechanism 178 or the like, located at positions in the strap far from the imaging devices 134A, 134B, and specifically not between two imaging devices 134A, 134B to improve comfort and convenience of the strap 100H. Additionally, a strap described herein can comprise a double strap as typically employed for mounting head strapped flash lights and similar wearable components.

Figure 11D:
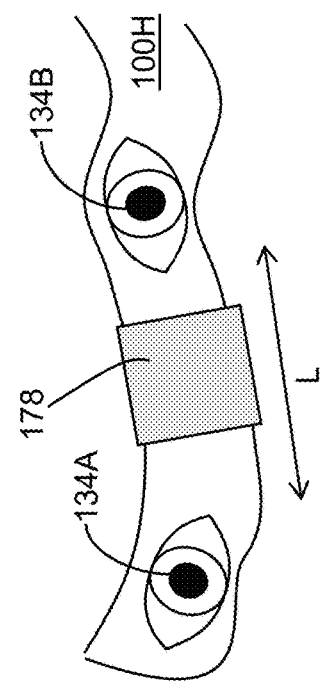

In an embodiment, the imaging devices 134A, 134B can be rotated about one or more axes of rotation. For example, FIG. 11D shows an illustrative rotatable imaging device 180 according to an embodiment. In this case, the imaging device 180 includes an objective lens 182 connected to a ball rotating mechanism 184, which can be rotated using any mechanism included in a mounting structure 186. In an embodiment, the ball rotating mechanism 184 allows rotation of the objective lens 182 over a predetermined range of degrees for one or more rotation axes 188A-188C. In a more particular embodiment, the amplitude of such rotations can be designed to allow the objective lens 182 to have the same range of solid angle rotation as the range of the user's eyes.

In an illustrative embodiment, the imaging device 180 can be utilized in conjunction with a solution for controlling the movement of the rotatable imaging device 180 based on the movement of the eyes of the user 2. For example, the movement of the eyes of the user 2 can be evaluated through the use of specially designed contact lenses, glasses, external cameras, and/or the like. Video data can be acquired by the imaging device 180 at a high frame per second rate with the imaging device 180 scanning through the solid angle of allowed rotations to capture a large area of the scene. Additionally, when implemented as illustrated in FIG. 11A, two imaging devices, such as the imaging device 180, can be operated to capture three-dimensional video, or any other video that can involve special effects associated with a process of video capture by two imaging devices 180, each having a capability of rotation through a solid angle.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A wearable device comprising:
a primary band having a first end and a second end, wherein the primary band is configured to secure the wearable device around a body part of a user, and wherein the primary band has a length and a securing mechanism configured to provide a variable amount of excess length when the wearable device is tightly secured around the body part;
a plurality of electronic components, wherein each of the plurality of electronic components is physically attached to the primary band at a location spaced from each of the other plurality of electronic components, the plurality of electronic components including:
an imaging device including an image capture sensor and an optical system for forming an image of a scene on the image capture sensor, wherein the imaging device is rotatable about at least one rotation axis with respect to an orientation of a portion of the primary band tightly securing the wearable device around the body part; and
a data storage device for storing image data acquired by the imaging device, wherein the data storage device is physically distinct from the imaging device, wherein the imaging device and the data storage device include means for communicating the image data acquired by the imaging device to the data storage device.

2. The device of claim 1, further comprising a set of conductive elements embedded in the primary band, wherein each of the plurality of electronic components is electrically connected to at least one of the set of conductive elements.

3. The device of claim 1, wherein the plurality of electronic components further includes a power source, wherein the power source provides power to at least one of: the imaging device or the data storage device.

4. The device of claim 1, wherein the imaging device is mounted in-line to the primary band using a mounting unit enabling rotation of the imaging device about the at least one rotation axis.

5. The device of claim 4, wherein the imaging device is physically attached to the primary band by a hinge.

6. The device of claim 4, wherein the mounting unit for the imaging device maintains the imaging device at a selected orientation with respect to the orientation of the primary band.

7. The device of claim 6, wherein the mounting unit is configured to maintain the imaging device at one of a plurality of discrete allowable angles.

8. The device of claim 1, further comprising a second imaging device physically attached to the primary band.

9. The device of claim 1, further comprising a supplemental band, wherein at least one end of the supplemental band is physically attached to the primary band.

10. The device of claim 1, wherein the primary band is formed of a flexible material.

11. The device of claim 1, wherein the imaging device is configured to be operated using at least one of: a motion-sensor, a voice command, or an input device located on the primary band.

12. The device of claim 1, wherein the plurality of electronic components further includes a light source located in line with the primary band.

13. The device of claim 1, wherein the data storage device is located in line with the primary band.

14. The device of claim 1, wherein the data storage device is implemented as part of a watch.

15. A wearable device comprising:
a primary band configured to secure the wearable device around a body part of a user;
a set of conductive elements embedded in the primary band; and
a plurality of electronic components, wherein each of the plurality of electronic components is physically attached to the primary band at a location spaced from each of the other plurality of electronic components, wherein each of the plurality of electronic components is electrically connected to at least one of the set of conductive elements, the plurality of electronic components including:
a first electronic component comprising a light source located in line with the primary band, wherein the light source illuminates a field of view for the user based on an orientation of the body part; and
a second electronic component comprising a power source, wherein the power source provides power to the light source.

16. The device of claim 15, further comprising an imaging device including an image capture sensor and an optical system for forming an image of a scene on the image capture sensor, wherein the imaging device is located in one of: the first electronic component or a third electronic component of the plurality of electronic components.

17. The device of claim 15, wherein an orientation of the light source can be rotated with respect to an orientation of the primary band.

18. The device of claim 17, wherein the light source is connected to the primary band by a hinge.

19. The device of claim 17, wherein a connecting mechanism for the light source maintains the light source at a selected orientation with respect to the orientation of the primary band.

20. The device of claim 15, wherein the second electronic component comprises a watch including a data storage device for storing image data acquired by the imaging device.

21. A wearable device comprising:
a primary band configured to secure the wearable device around a body part of a user;
a set of conductive elements embedded in the primary band; and
a plurality of electronic components, wherein each of the plurality of electronic components is physically attached to the primary band at a location spaced from each of the other plurality of electronic components, wherein each of the plurality of electronic components is electrically connected to at least one of the set of conductive elements, the plurality of electronic components including:
a first electronic component comprising a light source located in line with the primary band;
an imaging device including an image capture sensor and an optical system for forming an image of a scene on the image capture sensor, wherein the imaging device is located in one of: the first electronic component or a second electronic component of the plurality of electronic components, wherein the light source provides a visual indication of a field of view of the imaging device to the user, and wherein the light source turns the visual indication off in response to a request to capture an image with the imaging device; and
a third electronic component comprising a power source, wherein the power source provides power to at least one of: the imaging device or the light source.

22. The device of claim 21, wherein the light source comprises a set of lasers configured to: frame the field of view of the imaging device or direct a pattern of light toward a central region of the field of view of the imaging device.

23. The device of claim 15, wherein the body part is an arm of the user.

24. The device of claim 16, further comprising a fourth electronic component of the plurality of electronic components, the fourth electronic component comprising a data storage device for storing image data acquired by the imaging device, wherein the data storage device is physically distinct from the imaging device.

25. A wearable device comprising:
a primary band configured to secure the wearable device around a body part of a user;
a plurality of electronic components, wherein each of the plurality of electronic components is physically attached to the primary band at a location spaced from each of the other plurality of electronic components, the plurality of electronic components including:
a first electronic component comprising an imaging device including an image capture sensor and an optical system for forming an image of a scene on the image capture sensor, wherein the imaging device is rotatable about at least one rotation axis with respect to an orientation of a portion of the primary band tightly securing the wearable device around the body part; and
a second electronic component comprising at least one of: a power source, a data storage device, a wireless communications device, a flash, a light source, a laser source, a microphone, or an input device, wherein the second electronic component is configured to operate in conjunction with the imaging device.

26. A wearable device comprising:
a flexible band, wherein the flexible band includes at least one section formed of a fibrous material configured to conform to an object;
a set of conductive elements embedded in the flexible band, wherein the set of conductive elements embedded in the at least one section includes excess length to accommodate the at least one section stretching to conform to the object; and
a plurality of electronic components physically attached to the flexible band in a plurality of distinct locations and electrically connected to at least one of the set of conductive elements, wherein each of the plurality of electronic components is physically distinct, the plurality of electronic components including:
a first electronic component mounted in-line with the flexible band, the first electronic component comprising an image capture sensor and an optical system for forming an image of a scene on the image capture sensor; and
a second electronic component mounted in-line with the flexible band, the second electronic component comprising at least one of: a power source, a wireless communications device, a flash, a light source, a laser source, a microphone, or an input device, wherein the second electronic component is configured to operate in conjunction with the imaging device.

* * * * *